United States Patent
Skog et al.

(10) Patent No.: US 11,665,380 B2
(45) Date of Patent: May 30, 2023

(54) METHODS AND APPARATUS FOR RECEIVING ADAPTIVE BIT RATE CONTENT AND MANIFEST FOR ADAPTIVE BIT RATE CONTENT

(71) Applicant: Telefonaktiebolaget LM Ericsson (publ), Stockholm (SE)

(72) Inventors: Robert Skog, Hässelby (SE); Marcus Ihlar, Älvsjö (SE); Thorsten Lohmar, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/771,269

(22) PCT Filed: Dec. 20, 2017

(86) PCT No.: PCT/EP2017/083763
§ 371 (c)(1),
(2) Date: Jun. 10, 2020

(87) PCT Pub. No.: WO2019/120505
PCT Pub. Date: Jun. 27, 2019

(65) Prior Publication Data
US 2020/0382824 A1    Dec. 3, 2020

(51) Int. Cl.
*H04N 21/2343* (2011.01)
*H04N 21/235* (2011.01)
(Continued)

(52) U.S. Cl.
CPC ..... *H04N 21/23439* (2013.01); *H04L 65/612* (2022.05); *H04L 67/306* (2013.01);
(Continued)

(58) Field of Classification Search
CPC .......... H04N 21/8456; H04N 21/6582; H04N 21/23655; H04N 21/44209;
(Continued)

(56) References Cited

U.S. PATENT DOCUMENTS 10,623,787 B1 *   4/2020   Nielsen ............ H04N 21/23439
2014/0198641 A1   7/2014   Perkuhn et al.
(Continued)

FOREIGN PATENT DOCUMENTS

GB    2517060 A      2/2015
WO    2015063732 A1   5/2015

OTHER PUBLICATIONS

Gao, G. et al., "vCache: Supporting Cost-Efficient Adaptive Bitrate Streaming", IEEE MultiMedia: Advancing Multimedia Distrbution, vol. 24 No. 3, Jul. 1, 2017, pp. 19-27, IEEE.
(Continued)

*Primary Examiner* — Kyung H Shin
(74) *Attorney, Agent, or Firm* — Coats & Bennett, PLLC

(57) ABSTRACT

Methods and apparatus are provided for content delivery. In one aspect, a method in a device of receiving Adaptive Bit Rate (ABR) content comprises receiving an ABR manifest associated with the content, the ABR manifest describing segments of content and specifying a plurality of policies and respective associated data transfer rules, receiving an indication identifying one of the policies, and requesting segments of the content from a content delivery network in accordance with the content delivery rules associated with the policy identified by the indication.

15 Claims, 12 Drawing Sheets

(51) Int. Cl.
  *H04N 21/2662* (2011.01)
  *H04N 21/845* (2011.01)
  *H04L 65/612* (2022.01)
  *H04L 67/306* (2022.01)
  *H04L 67/568* (2022.01)

(52) U.S. Cl.
  CPC ....... *H04L 67/568* (2022.05); *H04N 21/2351* (2013.01); *H04N 21/2662* (2013.01); *H04N 21/8456* (2013.01)

(58) Field of Classification Search
  CPC ......... H04N 21/6375; H04N 21/23439; H04N 21/2662; H04N 21/8173; H04N 21/23611; G06F 16/9574; H04L 67/2857; H04L 67/2895; H04L 67/2842; H04L 67/2847; H04L 67/2852; H04L 67/26; H04L 67/1097; H04L 67/306; H04L 41/56; H04L 41/5096; H04L 67/568; H04L 67/5682; H04L 67/5681; H04L 67/5683; H04L 67/55
  See application file for complete search history.

(56) References Cited

U.S. PATENT DOCUMENTS

| | | |
|---|---|---|
| 2015/0201042 A1 | 7/2015 | Shah et al. |
| 2016/0191664 A1* | 6/2016 | Balakrishnan ........ H04L 67/306 709/203 |
| 2017/0055012 A1 | 2/2017 | Phillips et al. |

OTHER PUBLICATIONS

Famaey, J. et al., "Experiments on HTTP Adaptive Streaming Over Interconnected Content Delivery Networks", Content Delivery Networks Interconnection Working Group, Jan. 24, 2013, pp. 1-15, draft-famaey-cdni-has-experiments-01, Content Delivery Networks Interconnection Working Group.

* cited by examiner

```
<MPD ...>
  <policies>
    <policy id=1234>
      <RepID>V1</RepID>
      <RepID>V2</RepID>
    </policy>
    <policy id=5634>
      ...
    </policy>
  </policies>

<BaseURL>http://www.example.com/</BaseURL>

<Period>
   <AdaptationSet ...>
   <ContentComponent contentType="video" id="1"/>
   <Representation id="V1" bandwidth="1048576" ..>
    <SegmentTemplate media="V1/seg-$Number$.mp4" ../>
   </Representation>
   <Representation id="V2" bandwidth="2097152" ..>
    <SegmentTemplate media="V2/seg-$Number$.mp4" ../>
   </Representation>
   <Representation id="V3" bandwidth="3145728" ..>
<SegmentTemplate media="V3/seg-$Number$.mp4" ../>
 </Representation>
 </AdaptationSet>
 <AdaptationSet lang="und" ..> ...
</Period>
 ...
</MPD>
```

FIG. 22

METHODS AND APPARATUS FOR RECEIVING ADAPTIVE BIT RATE CONTENT AND MANIFEST FOR ADAPTIVE BIT RATE CONTENT

TECHNICAL FIELD

Examples of the present disclosure relate to methods and apparatus, for example for receiving Adaptive Bit Rate (ABR) content, and to a manifest for ABR content.

BACKGROUND

A content delivery network or content distribution network (CDN) is a large distributed system of proxy servers deployed in multiple data centers via the Internet. The goal of a CDN is to serve content to end-users with high availability and high performance. CDNs serve a large fraction of Internet content, including web objects (text, graphics and scripts), downloadable objects (media files, software, and documents), applications (e-commerce, portals), live streaming media, on-demand streaming media and social networks.

Requests for content from a device may be directed to a node in a CDN that is optimal in some way. For example, a node that is best for serving content to the device may be chosen. This may be determined, for example, by choosing a node that has the fewest network hops to the device, the shortest latency to the device, or the highest availability. When optimizing for cost, locations that are least expensive may be chosen instead.

Adaptive bitrate streaming is a technique used in streaming some media content over communication networks. While earlier streaming systems used protocols such as RTP with RTSP, later adaptive streaming technologies are usually based on HTTP and designed to work efficiently over large distributed HTTP networks such as the Internet.

In some circumstances, it may be desirable to reduce the data rate available to deliver certain content such as video to a device. For example, some content may be "zero-rated," in that downloading of the content to a device over a network is not counted towards a maximum amount of data that the device is permitted to download, for example as part of a contract between the network and the device's user. Such content may be popular with many users, and hence reducing the available data rate available to deliver the content (also known as throttling or traffic shaping) may reduce the risk of the network becoming congested.

SUMMARY

One aspect of the present disclosure provides a method in a device of receiving Adaptive Bit Rate (ABR) content. The method comprises receiving an ABR manifest associated with the content, the ABR manifest describing segments of content and specifying a plurality of policies and respective associated data transfer rules, receiving an indication identifying one of the policies, and requesting segments of the content from a content delivery network in accordance with the content delivery rules associated with the policy identified by the indication.

Another aspect of the present disclosure provides a manifest data structure for Adaptive Bit Rate (ABR) content. The data structure comprises information identifying a plurality of representations of the media content with respective data rates, information identifying, for each of the representations, respective segments of the media content, and information identifying a plurality of data transfer policies for transfer of the media content from a content delivery network to a device.

A further aspect of the present disclosure provides apparatus for receiving Adaptive Bit Rate (ABR) content. The apparatus comprises a processor and a memory. The memory contains instructions executable by the processor such that the apparatus is operable to receive an ABR manifest associated with the content, the ABR manifest describing a plurality of segments of content and specifying a plurality of policies and respective associated data transfer rules, receive an indication identifying one of the policies, and request segments of the content from a content delivery network in accordance with the data transfer rules associated with the policy identified by the indication A still further aspect of the present disclosure provides apparatus for receiving Adaptive Bit Rate (ABR) content. The apparatus comprises a first receiving module configured to receive an ABR manifest associated with the content, the ABR manifest describing segments of content and specifying a plurality of policies and respective associated data transfer rules, a second receiving module configured to receive an indication identifying one of the policies, and a requesting module configured to request segments of the content from a content delivery network in accordance with the data transfer rules associated with the policy identified by the indication.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 22 a schematic illustration of an example of portions of an example manifest data structure.

DETAILED DESCRIPTION

Figure 1:
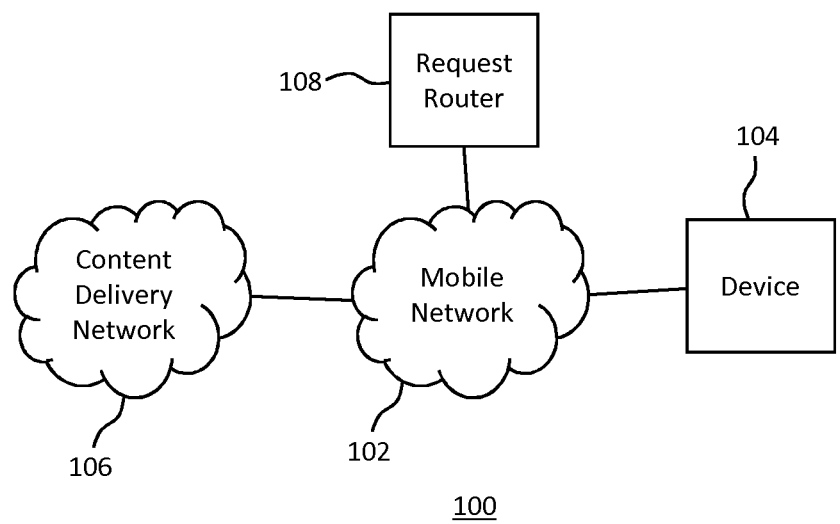
FIG. 1 is a schematic illustration of an example of a communications system.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

When it is desired to throttle delivery of content such as video or other multimedia to a device from a content delivery network through another network, such as a mobile network, the other network (e.g. mobile network) reduces the data rate available for downloading the content. If the content is Adaptive Bit Rate (ABR) content, a device receiving and consuming the content (e.g. viewing a video) may monitor the content download bitrate and estimate (e.g. directly or via buffer level) the ratio between download bitrate and link bitrate, the link bitrate being the estimated bitrate of a connection between the device and a network (e.g. mobile network). The link bitrate should be larger than the media bitrate to ensure a continuous playback of the content. The device may switch to a lower quality of the content having a lower bitrate when the device estimates that the download bitrate is equal to or larger than the link bitrate. The device may switch to a higher quality for the content when it estimates that the link bitrate is larger than the download bitrate, or a buffer contains a sufficiently large amount of content still to be consumed.

Throttling of the content presents a lower bit rate to the device for downloading the content, and causes the device to select a quality for the content that is not the highest quality that the device could select if the network did not throttle delivery of the content. Therefore, usage of network bandwidth by the device when downloading the content can be controlled. However, throttling or traffic shaping by the network has a detrimental effect on performance of the device or the network. For example, a Radio Access Network (RAN) scheduler may not be able to fill radio slots assigned to the device, and thus data is transmitted to the device at a lower spectral efficiency. Furthermore, as the device is receiving the content at a lower bit rate than is supported by the connection between the device and the network, the device may need to remain active for longer while downloading the content, which may have a detrimental effect on battery life of the device, for example.

Embodiments of this disclosure seek to provide a more efficient means for controlling (e.g. capping) delivery of content to a device.

FIG. 1 shows an example of a communications system 100. The communications system 100 includes a mobile network 102 to which a device 104 is connected. The device 104 may consume content that is provided by a Content Delivery Network (CDN) 106 over the mobile network 102. The communications system 100 also includes a Request Router (RR) 108. The RR 108 may receive requests for content (e.g. a request for a manifest associated with the content) from the device 104 and redirect the device to the CDN 106.

In some examples, the mobile network 102 may wish to control delivery of content to the device 104. For example, the mobile network 102 may wish to reduce the quality of content delivered to the device 104 if the content is zero-rated for the device.

Figure 2:
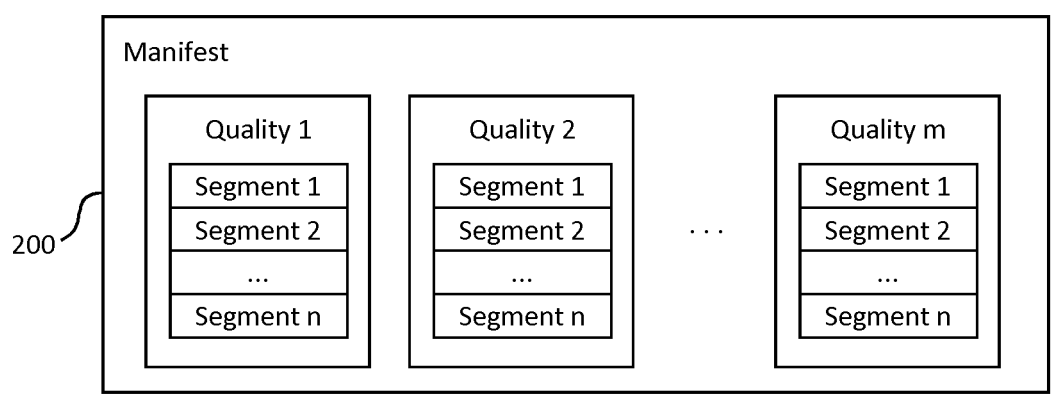
FIG. 2 is a schematic illustration of an example of a manifest associated with content.

FIG. 2 shows an example of a manifest 200 associated with Adaptive Bit Rate (ABR) content. Data associated with the content (e.g. a video) is split into n segments, for example n segments of equal length, such as 10 seconds. Each segment is represented by m data files having respective quality levels, and therefore respective bitrates and file sizes. Data associated with the content therefore comprises n*m data files. The manifest 200 identifies locations in a network (e.g. CDN 106), such as filenames or URLs, from which each of the segments can be retrieved. For example, the manifest 200 identifies n data files having a first quality, n data files having a second quality, and so on. A segment of content at different quality levels may have different file sizes. Therefore, for example, where an available download bitrate between a node (e.g. a CDN or cache node) and a device (e.g. device 104) is large, the device may request larger segments and thus provide the content (e.g. display a video) at a high quality. Conversely, where the available download bitrate is lower, the device may request smaller segments for lower quality content. By separating each quality level into segments, the device may select a quality level on the fly with regard to changing network conditions and available download bitrate, and may seamlessly provide (e.g. display) adjacent segments of different quality levels to the user with little or no interruption.

Figure 3:
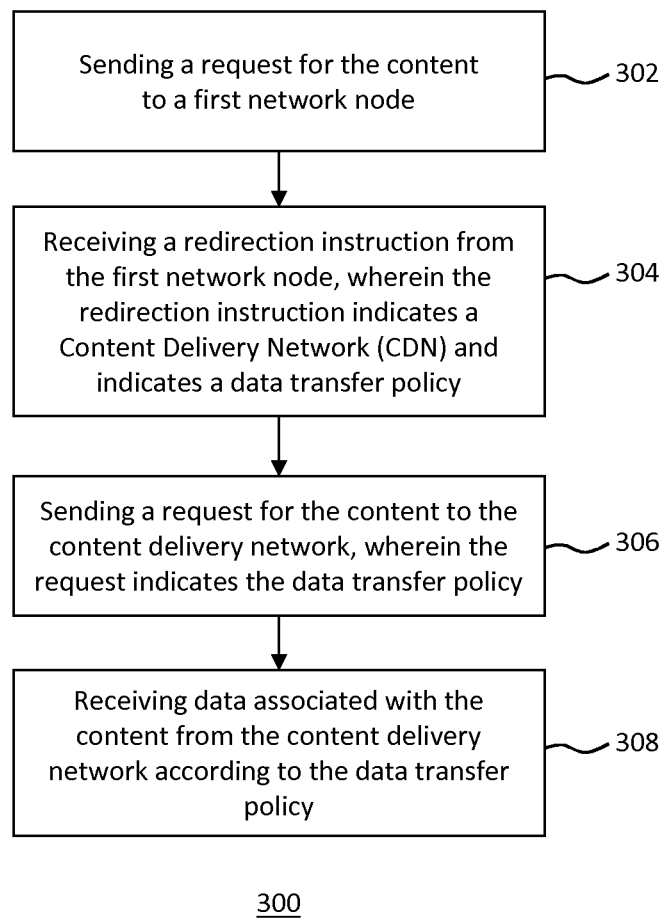
FIG. 3 is a flow chart of an example of a method of receiving content in a device.

FIG. 3 shows an example of a method 300 of receiving content in a device. The device may be for example the device 104 of FIG. 1. The content may be, for example, Adaptive Bitrate (ABR) content such as ABR video. A first step 302 of the method comprises sending a request for the content to a first network node. In some examples, the request comprises a HTTP GET request for a manifest associated with the content, the request identifying the Request Router 108. The RR 108 may be identified by an IP address of the RR 108 in the request. The IP address may have been previously obtained by the device 104 for example through a DNS resolution request sent to the mobile network 102. The DNS resolution request may identify a Uniform Resource Locator (URL) or Fully Qualified Domain Name (FQDN) of the manifest.

The method 300 includes a step 304 of receiving a redirection instruction from the first network node, wherein the redirection instruction indicates a Content Delivery Network (CDN) and indicates a data transfer policy. The redirection instruction may, for example, instruct the device 104 to retrieve the requested content (e.g. manifest) from the CDN 106. The redirection instruction may for example be a HTTP Redirect instruction, such as a HTTP message with status code 301 Moved Permanently, 303 See Other or 307 Temporary Redirect. The redirection instruction may indicate the CDN by including an indication in the redirection instruction. For example, the indication may be included in a HTTP header of the redirection instruction. Alternatively, for example, the redirection instruction may identify the CDN (e.g. a node in the CDN such as a cache node) with a URL of the CDN, for example a URL of the requested manifest within the CDN. The URL may include a query parameter with a value that identifies a data transfer policy. An example of such a URL may be http://123.234.56.78/manifests/requested_manifest.m3u?policy=1234, where policy=1234 identifies the data transfer policy as '1234'.

In some examples, the RR 108 determines that a data transfer policy should be included in the redirection instruction, and/or may determine which policy should be indicated. For example, the RR 108 may determine that the requested content should be zero-rated for the user and thus provide an indication of a particular policy, such as a policy that controls the quality of the content provided to the device. In some cases, the RR 108 may be a part of mobile network 102.

The method 300 also includes a step 306 of sending a request for the content to the content delivery network, wherein the request indicates the data transfer policy. For example, the device essentially forwards an indication of the data transfer policy to the CDN. In some examples, where the redirection instruction identifies the CDN with a URL that includes a query parameter with a value that identifies a data transfer policy, the device may request for the content to the content delivery network will include the URL and hence will include the parameter identifying the data transfer policy.

Step 308 of the method 300 comprises receiving data associated with the content from the content delivery network according to the data transfer policy. For example, the data may be received in the form of portions of data such as segments of content. In some examples, delivery of the data transfer policy is enforced by the CDN, such as for example a node (e.g. cache node) in the CDN. For example, a manifest associated with the content provided to the device may identify only those quality levels that comply with the policy, and so the device cannot request quality levels that do not comply with the policy. Alternatively, if the device requests content at a quality that is not permitted under the data transfer policy, the CDN may indicate that the requested content is unavailable (e.g. with an HTTP 404 Not Found message), causing the device to request the content at a different quality.

The data transfer policy may for example indicate a property of the transfer of data from the content delivery network to the device, or a property of the data (e.g. content) itself. For example, the policy may indicate a data rate (e.g. media bitrate), a content quality, a maximum data rate (e.g. maximum media bitrate) or a maximum content quality. For example, the data transfer policy may indicate one or more bit rates that are permitted, or may for example identify particular representations in a content description data structure such as a manifest that are permitted under the policy.

In some examples, the redirection instruction includes an indication of the data transfer policy that is encoded, encrypted or scrambled. For example, if the redirection instruction redirects the device to retrieve a manifest from within a CDN, and the indication of the data transfer policy is a parameter within the URL, the parameter may be encoded, encrypted or scrambled such that it cannot be understood by the device or a third party. This may hinder or prevent the device or third party from, for example, modifying the indicated data transfer policy, applying the same policy to other content, or applying a policy for other content or another device to the requested content, for example. Additionally or alternatively, a URL of a manifest requested by the device, and sent for example to RR 108, may be encoded, encrypted or scrambled, so that it cannot be interpreted by an intermediate network such as mobile network 102. This may ensure privacy between the content provider and the device.

In some examples, an indication of a data transfer policy may specify rules of the data transfer policy. For example, the rules may specify permitted download bitrates, a maximum permitted bit rate, or one or more other rules for transfer of the content from the CDN to the device. In other examples, the indication of the data transfer policy may comprise an identifier that the CDN may use to retrieve rules for the identified data transfer policy.

Figure 4:
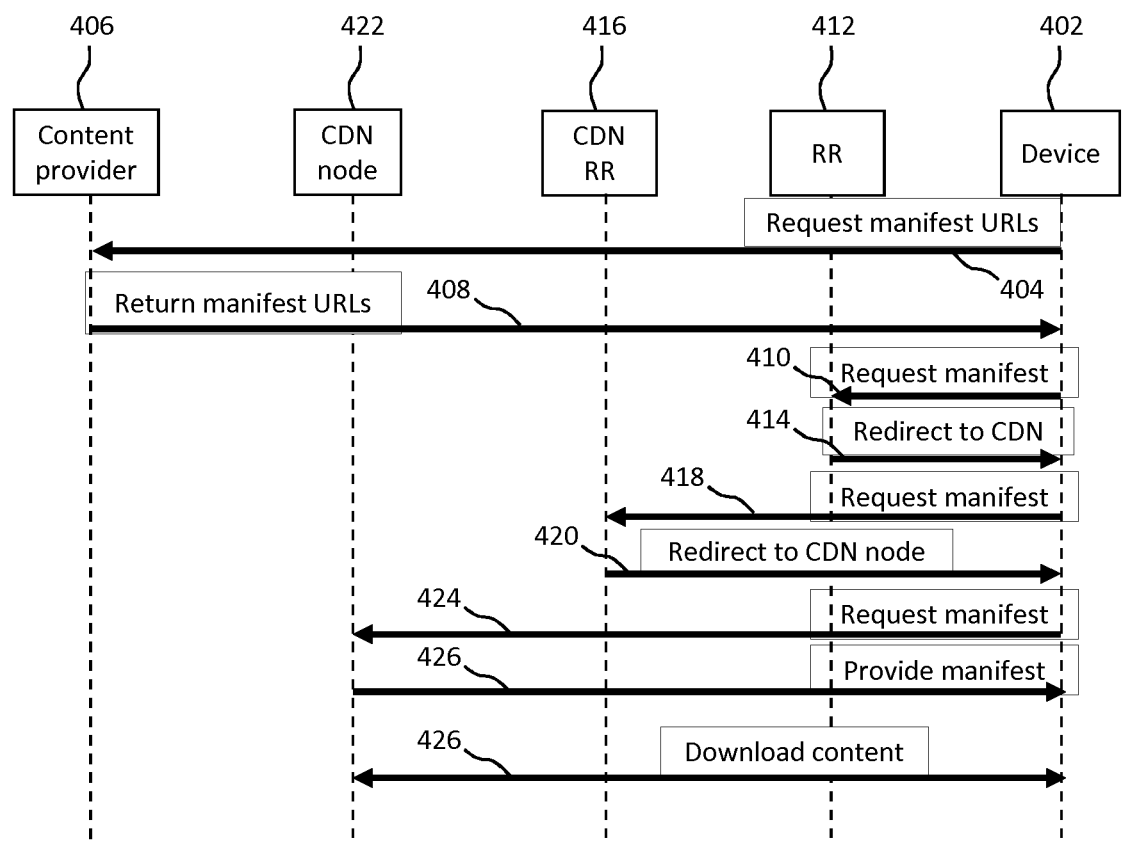
FIG. 4 is a schematic illustration of an example of communications within a communications system.

FIG. 4 shows an example of communications within a communication system according to an example. A device 402, which may for example be device 104 shown in FIG. 1, sends a request 404 for one or more manifest URLs to a content provider 406. The content provider 406 returns manifest URLs 408 to the device 402. The URLs may be, for example, a web page with a number of links that are URLs pointing to different content (e.g. different videos). The device then sends a request 410 to a Request Router 412 (e.g. RR 108 shown in FIG. 1) for a manifest. The request is sent to the RR 412 as, for example, the URLs from the content provider point to the RR 412, or a DNS lookup of a URL or FQDN associated with the request resolves to the IP address of the RR 412. The RR 412 replies with a redirect 414 (e.g. HTTP Redirect) that identifies a RR 416 within a CDN, and includes an indication of a data transfer policy.

The device then sends a request 418 for the manifest to the CDN RR 416. The request 418 may also include the indication of the data transfer policy. The CDN RR 416 replies with a redirect 420 to a CDN node 422 such as a cache node. The CDN and/or the cache node may be selected based on certain criteria. For example, the CDN and/or cache node may be preferable to the device, such as having the fewest hops to the device, the shortest latency, the geographically closest location, and/or any other criteria.

The device 402 then sends a request 424 for the manifest to the CDN node 422, which returns the manifest 426 to the device 402. The device 402 can then download the content 426, such as for example requesting one or more segments of ABR content, from the CDN node 422. As indicated above, enforcement of the data transfer policy may be done by, for example, the CDN node 422, for example by providing only permitted quality levels in the manifest, or by making impermissible quality levels unavailable to the device 402.

Figure 5:
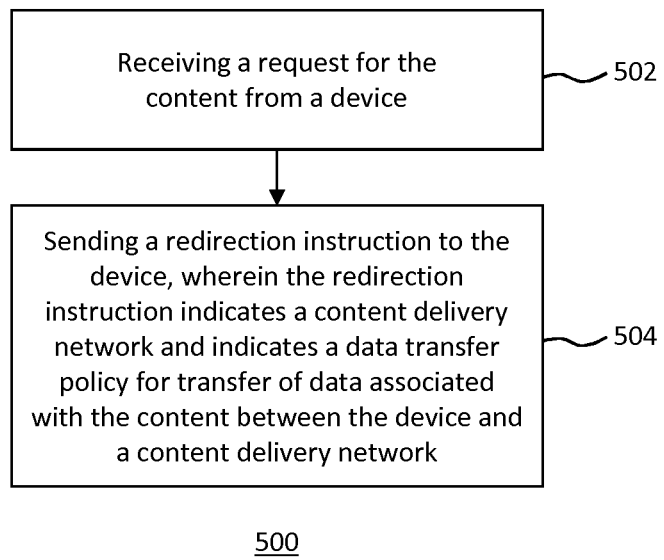
FIG. 5 is a flow chart of an example of a method in a network node.

FIG. 5 shows an example of a method 500 of in a network node. The method 500 may be carried out, for example, by a Request Router, a CDN node, a cache node or any other suitable node in a network. The method 500 comprises, in a first step, receiving a request for the content from a device. A second step 504 of the method 500 comprises sending a redirection instruction to the device, wherein the redirection instruction indicates a content delivery network (e.g. a node within a CDN) and indicates a data transfer policy for transfer of data associated with the content between the device and a content delivery network. The redirection instruction may for example include an indication of the data transfer policy, such as in a HTTP Header of a HTTP Redirection instruction, or may be included in a URL in the redirection instruction.

The method 500 may be implemented by a node, such as for example a Request Router, that determines the data transfer policy and includes an indication in the redirection instruction. Alternatively, for example, the method 500 may be implemented in a node such as a CDN RR, CDN node or cache node, where an indication of the data transfer policy is included in the request for content from the device.

Figure 6:
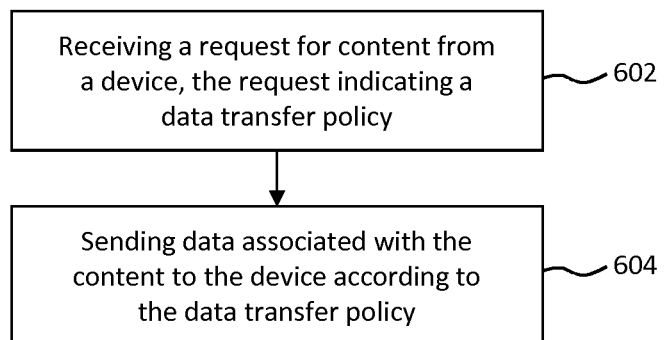
FIG. 6 is a flow chart of an example of a method in a content delivery network.

FIG. 6 shows an example of a method 600 in a content delivery network. The method 600 may be implemented by for example a node providing content such as a cache node. The method 600 includes, in step 602, receiving a request for content from a device, the request indicating a data transfer policy, and in step 604, sending data associated with the content to the device according to the data transfer policy. In some examples, the node implementing the method 600 may send a manifest associated with the content to the device, and may remove impermissible quality levels (i.e. impermissible according to the data transfer policy) from a manifest provided to the device, or may make impermissible quality levels inaccessible by the device. The request for the content may be, for example, a request for a manifest. The data associated with the content may be, for example, one or more portions of media (e.g. segments of content) requested by the device.

In at least some embodiments disclosed herein, responsibility for implementing or enforcing the data transfer policy, or any content delivery policy, may reside with the node providing the content (e.g. a CDN cache) and/or the device receiving the content (e.g. a wireless device or User Equipment, UE). However, the content being delivered may traverse another network, such as a mobile network. It may be desirable for an operator of the another network to monitor the content delivery to ensure that the data transfer policy is being complied with, and to take action upon detection of any violation of the data transfer policy, such as for example a device downloading content having a bitrate greater than that permitted by the policy.

Figure 7:
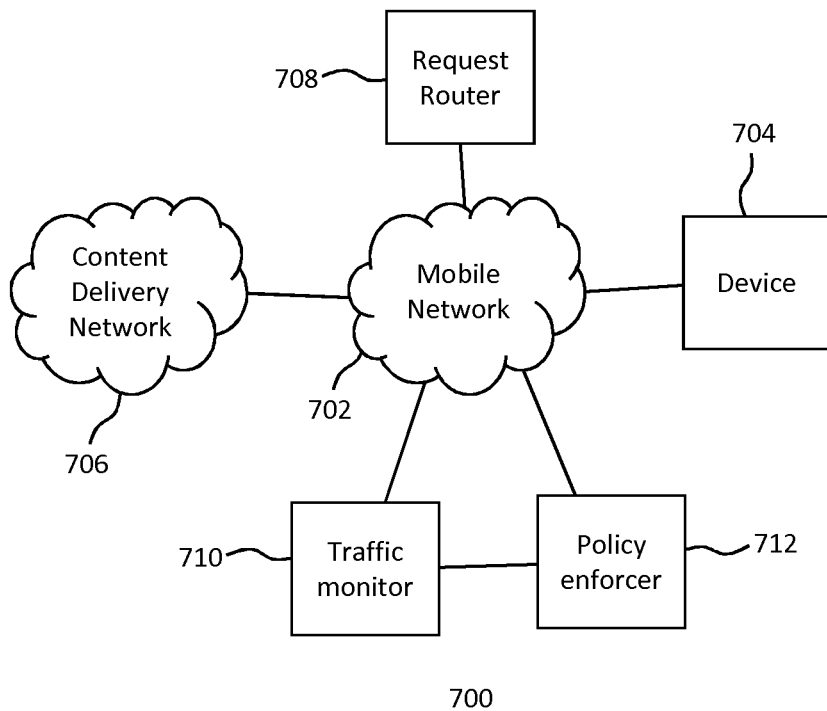
FIG. 7 is a schematic illustration of an example of a communications system.

FIG. 7 shows an example of a communications system 700. The communications system 700 includes a mobile network 702, device 704, CDN 706 and RR 708, which may be similar in at least some aspects to the mobile network 102, device 104, CDN 106 and RR 108 shown in FIG. 1. The communications system 700 also includes a traffic monitor 710 and a policy enforcer 712. The RR 708, traffic monitor 710 and/or policy enforcer 712 may in some examples be part of the mobile network 702.

The traffic monitor 710 may monitor compliance of content delivery to devices with a data transfer policy or with a content delivery policy. Upon violation of a policy, the traffic monitor 710 may take a notification action, such as for example send a notification to policy enforcer 712. The policy enforcer 712 may take action to enforce the policy, such as for example by notifying the CDN 706 and/or device 704, by throttling content delivery to the device 704, by sending notifications to the CDN 706 and/or device 704, by charging the CDN 706 and/or user of the device 704, and/or any other action.

Figure 8:
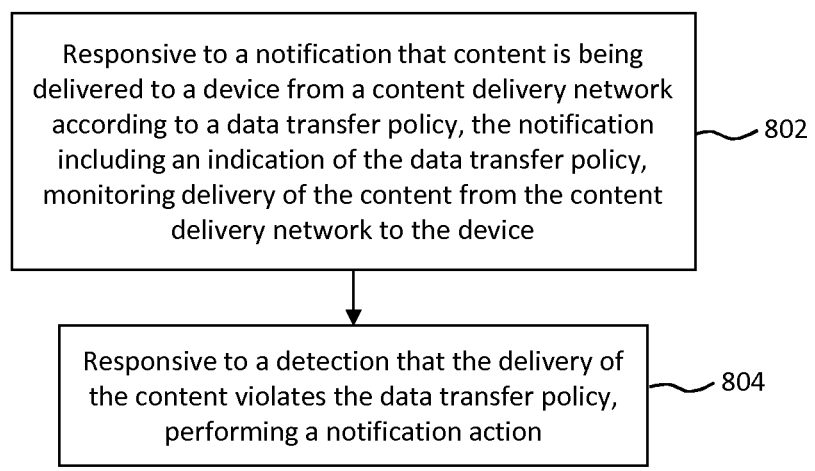
FIG. 8 is a flow chart of an example of a method in a traffic monitor.

FIG. 8 shows an example of a method 800 in a traffic monitor, such as for example traffic monitor 710, in a communications network. The method 800 comprises, in step 802, responsive to a notification that content is being delivered to a device from a content delivery network according to a data transfer policy, the notification including an indication of the data transfer policy, monitoring delivery of the content from the content delivery network to the device. The notification may be received from another node, such as for example a node in the mobile network 702, the RR 708, and/or any other node. The notification includes an indication of the data transfer policy so that the traffic monitor may determine whether the monitored traffic complies with or violates the policy. Step 804 of the method 800 comprises, responsive to a detection that the delivery of the content violates the data transfer policy, performing a notification action. The notification action may be, for example, a notification to the policy enforcer that delivery of content from the CDN 706 to the device 704 has violated the data transfer policy (or a content delivery policy).

Content delivery traffic from the content providing node to the device may be transmitted via a node implementing the method 800. Alternatively, for example, a traffic monitoring node may insert one or more traffic monitoring nodes into user plane paths for the purpose of monitoring content delivery.

In some examples, performing the notification or enforcement action comprises sending an alarm notification to a node in the communications network. The node may be the policy enforcer or another node, such as for example a node in the mobile network 702. Additionally or alternatively, performing the notification action may comprise notifying an enforcement entity (e.g. policy enforcer 712) to enforce the data transfer policy for the delivery of the content from the content delivery network to the device.

The traffic monitor 710 may monitor delivery of data associated with the content, such as delivery of segments of content requested by the device 704. Monitoring delivery of the content from the content delivery network to the device may in some examples comprise monitoring communications that match a 5-tuple associated with delivery of the content from the content delivery network to the device. In an illustrative example, the notification in step 802 may be received at the traffic monitor 710 from the Request Router 708, the Request Router 708 indicating at least one parameter of the 5-tuple. The 5-tuple may comprise a set of five parameters that characterize a connection between a node delivering content (e.g. a node in the CDN 706) and the device 704. The parameters of the 5-tuple may specify the source IP address and port number of the node delivering content, the destination IP address and port number of the device 704 and the protocol in use (e.g. TCP/IP). In response, the traffic monitor may monitor for communications within the network that match the parameters of the 5-tuple. For example, the traffic monitor may monitor for packets traversing the network that match the parameters of the 5-tuple. By determining the number and size of the packets, the traffic monitor 710 may determine the data rate of data being transferred between the node delivering content and the device 704, and thus may determine whether the supply of data has violated the data transfer policy or content delivery policy. The notification from the RR 708 (or from any other suitable node) may be triggered by a request from the device 704 for content, such as a manifest. Monitoring communications that match a 5-tuple is provided herein as an illustrative example. Other examples include monitoring communications that match a 3-tuple (e.g. source IP address, destination IP address and destination port), or monitoring any properties of the communications such that they can be identified. Another example comprises monitoring a combination of source IP address and server hostname, which the TDF can observe either from a URL if the request is clear-text HTTP or the Server Name Indication (SNI) field of the client hello message sent by the client when establishing an HTTPS session.

Figure 9:
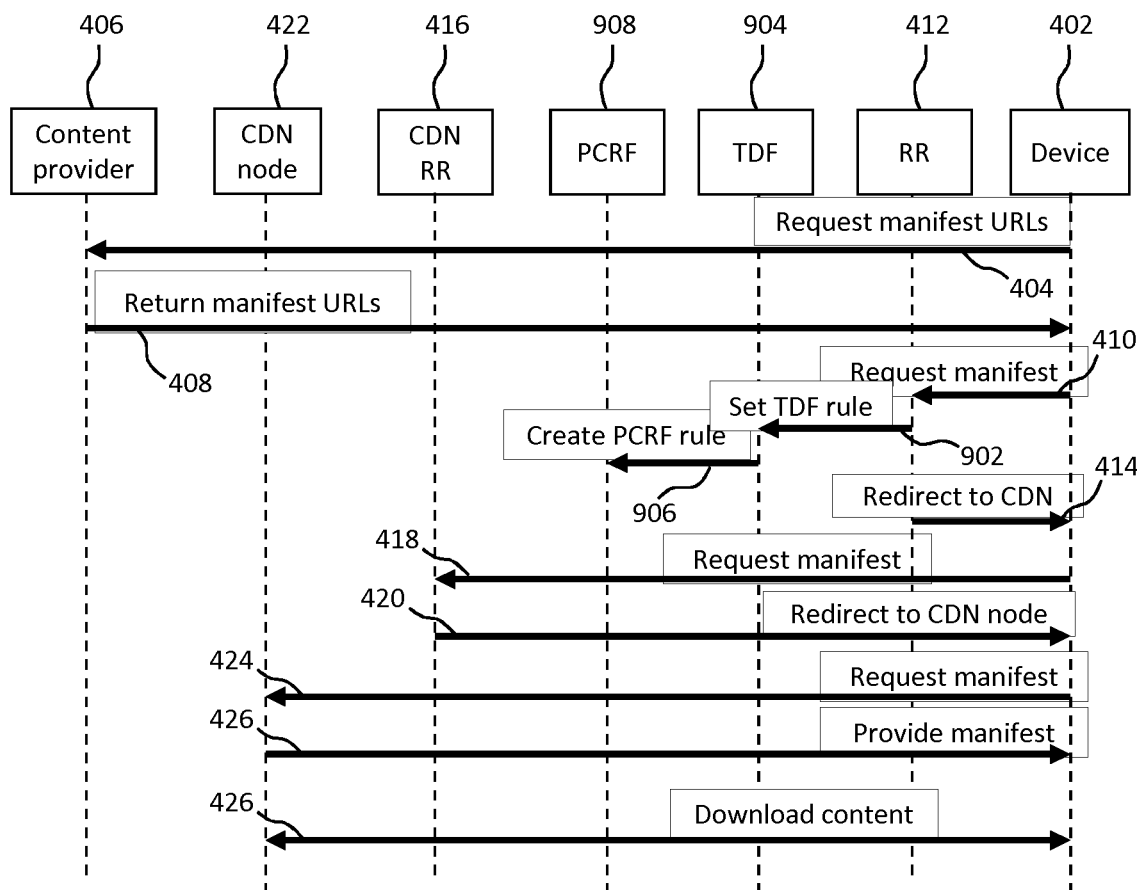
FIG. 9 is a schematic illustration of an example of communications within a communications system.

FIG. 9 shows an example of communications within a communications system. The communications and communications system include the elements shown in FIG. 4. However, the communications system of FIG. 9 includes additional communications. In response to the request 410 for the manifest from the device 402 to the RR 412, the RR sends a communication 902 to set a TDF rule to Traffic Detection Function (TDF) 904, which may be for example an element of mobile network 702 shown in FIG. 7. The TDF rule may cause the TDF 904 to monitor for traffic corresponding to content delivery from CDN node 422 to the device 402, such as for example monitoring for communications that match a particular 5-tuple. The TDF 904 in the example shown also sends a notification 906 to Policy and Charging Rules Function (PCRF) 908 to create a PCRF rule. The PCRF rule may indicate, for example, that the traffic should be zero-rated, not count towards the device's bandwidth usage, and/or should not be charged to the CDN or the user of the device 402. The PCRF may also therefore in some examples monitor for content delivery traffic from CDN node 422 to device 402, e.g. that matches a particular 5-tuple, so as to implement network charging policies for example. Thus, during download 426 of content, the TDF 904 may monitor the content download, and may perform a notification action if violation of the TDF rule (which may comprise or represent a data transfer policy or content delivery policy) is detected.

In some examples, a manifest for content may be tailored to a particular device, such as for example removing references to quality levels and bitrates that do not comply with a data transfer policy or content delivery policy. However, this may place a burden on a node delivering the manifest or associated data, or on another network node. In some embodiments disclosed herein, a manifest is provided that is not customized for a particular device or policy, but instead presents all available quality levels and bit rates, and also presents a plurality of policies and policy rules.

Figure 10:
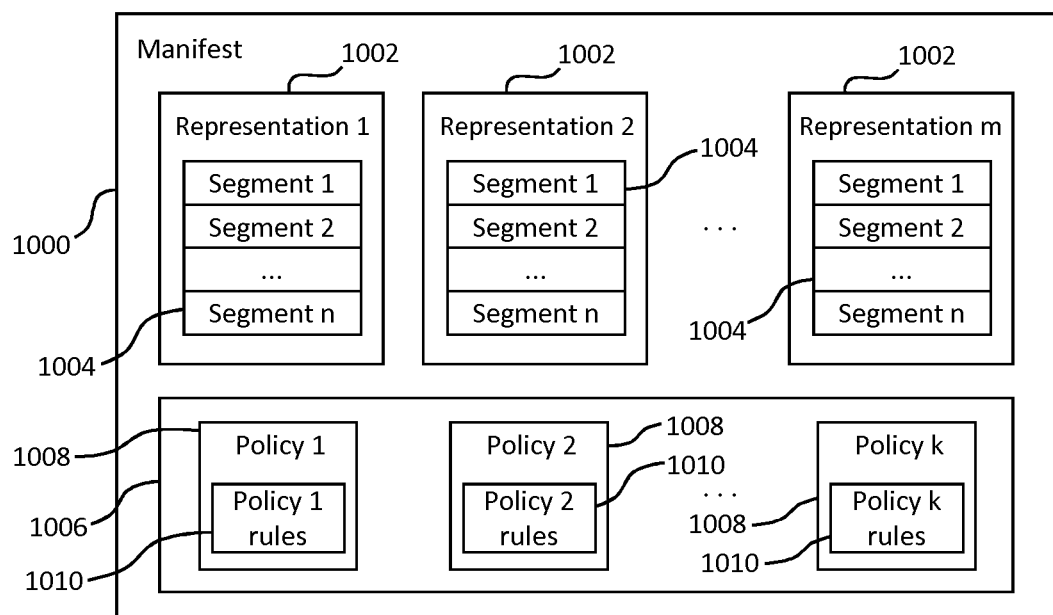
FIG. 10 is a schematic illustration of an example of a manifest data structure.

FIG. 10 shows an example of a manifest data structure 1000 according to embodiments of this disclosure. The manifest data structure includes information 1002 identifying a plurality of representations of the media content with respective data rates, such as for example different quality levels for the content. The manifest 1000 also includes information 1004 identifying, for each of the representations, respective segments of the media content, and information 1006 identifying a plurality of content delivery policies 1008 for transfer of the media content from a content delivery network to a device. The content policies 1008 may each have associated content delivery or data transfer rules 1010. The content delivery policies may specify any permitted parameter for transfer of content to a device. For example, the policies may specify which representations are permitted for a policy, permitted data rates or quality levels, maximum data rates or quality levels, segment lengths or sizes, buffering requirements, and/or any other parameters.

In one example, there are m representations, each relating to a respective quality level or bitrate, and for each representation there are n segments. The manifest 1000 therefore indicates n*m data files. In the example manifest 1000 shown, there are also k policies, each with associated policy rules.

In some examples, the manifest 1000 may be provided to a plurality of devices (e.g. all devices) requesting the manifest from a CDN, and thus the manifest may not be customized for all devices. In some examples, the content delivery policy may be implemented by a device that wishes to download content. The device may receive an indication of the policy to be applied from any suitable source. For example, the policy to be applied may be included in a redirection request from a RR in a manner as described above.

In some cases where a manifest file may be generated or amended on the fly for a particular device requesting content, the manifest may not be stored in a network cache (e.g. CDN cache). However, for a manifest that may be provided to a device with little or no amendment, such as for example manifest 1000, the manifest may be stored in a repository such as a network cache, which may also be a node that serves content to a device.

Figure 11:
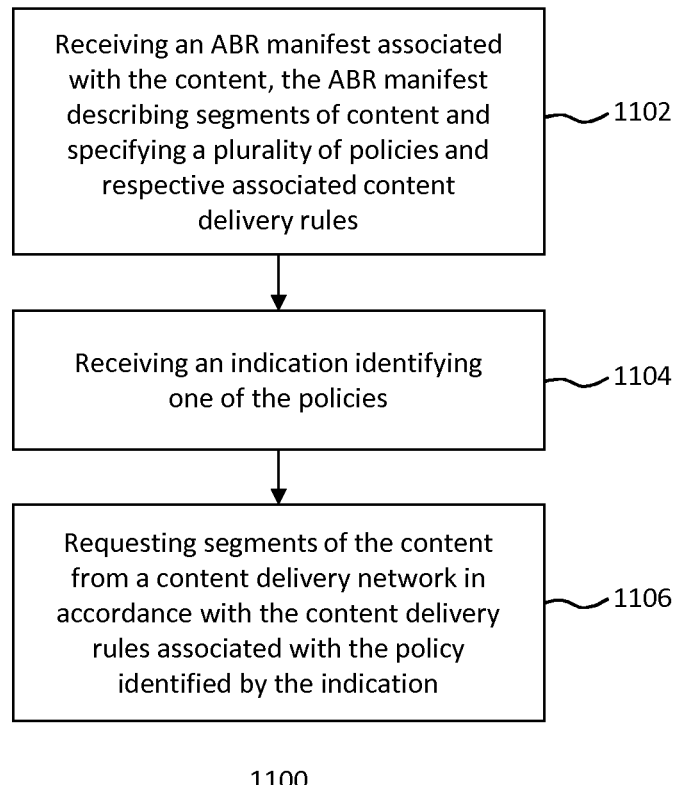
FIG. 11 is a flow chart of an example of a method of receiving Adaptive Bit Rate (ABR) content.

FIG. 11 shows an example of a method 1100 of receiving Adaptive Bit Rate (ABR) content. The method 1100 may be implemented, for example, by a device downloading content. The method 1100 comprises, in step 1102, receiving an ABR manifest associated with the content, the ABR manifest describing segments of content and specifying a plurality of policies and respective associated content delivery rules. The ABR manifest may be, for example, the manifest 1000 shown in FIG. 10. The content delivery rules may specify, for each policy, respective parameters for delivery of content to a device, such as for example data rate, maximum data rate, quality, maximum quality, buffering requirements, segment size, and/or any other parameters.

Step 1104 of the method 1100 comprises receiving an indication identifying one of the policies. The indication may be received in any suitable manner, including in any of the manners identified above. For example, the indication may be included in a HTTP Redirect instruction in a header or a URL, or may be received in an alternative communication. The indication may be received from a Request Router, from a CDN or a node within the CDN such as a cache node, or from any other suitable node. The manifest may be received from the CDN, and may be received from the same node as the indication or another node, and may be received in the same communication as the manifest, such as for example in a HTTP header of a HTTP communication containing the manifest.

Step 1106 of the method 1100 comprises requesting segments of the content from a content delivery network in accordance with the content delivery rules associated with the policy identified by the indication.

A particular example will now be described. When a RR redirects a device to retrieve a manifest from a provider (e.g. CDN), using for example any of the suitable redirect instructions disclosed herein, the RR appends a policy parameter, e.g. policy=1234, to the URL in the redirection instruction. The parameter may be obfuscated (e.g. encoded, encrypted or scrambled). The following steps are performed.

1. A device requests a manifest from a Request Router (RR) in a mobile network.
2. The Request Router (RR) a mobile network detects that the content is eligible for zero rating. The RR sends a redirection instruction to the device and appends a policy identifier to the URL in the redirection instruction, and this identifier reaches the CDN node via the device requesting the manifest.

3. The manifest server (e.g. CDN node) of the content provider detects the policy information in the URL. The manifest server (possibly in combination with other information) selects a policy identifier and signals the policy identifier to the device. There are different ways that the manifest server may convey the policy identifier to the device. For example, in a HTTP response to the device, the CDN node inserts a special policy selection into the HTTP response headers. Alternatively, when the device receives the manifest, the device retrieves the policy selection from the HTTP response headers in the HTTP communication that contains the manifest. Alternatively, the device may fetch HTTP redirection URLs from the HTTP stack. Here, the device listens to the HTTP redirects and fetches any manifest redirection URL from the local HTTP stack. The device is able to catch the URL to which the RR has redirected the device. The player may then determine the policy selection from the URL.

4. The device receives the universal manifest and the policy identifier from the CDN ode (e.g. manifest server). The device looks up the appropriate policy rules using the policy rule identifier.

5. The device follows the policy rule. CDN segment streamer nodes may also monitor policy compliance. For example, when a device selects segments from a non-policy compliant representation and requests them from a CDN node, the CDN node may reject the request (e.g. HTTP 404 Not Found).

Figure 12:
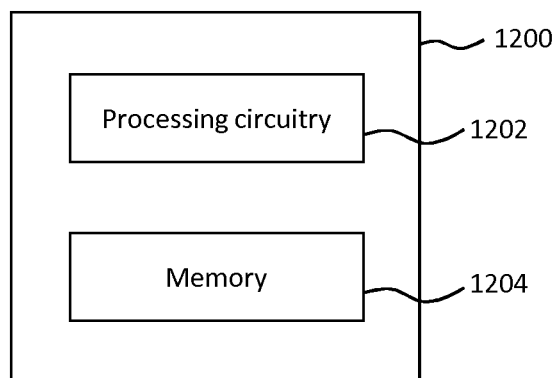
FIG. 12 is a schematic illustration of an example of apparatus for receiving content.

FIG. 12 shows an example of apparatus 1200 according to embodiments of the disclosure. The apparatus 1200 may be for example an apparatus for receiving content. The apparatus 1200 may be configured to perform the method of FIG. 3 or any other example.

The apparatus 1200 comprises processing circuitry 1202 (e.g. a processor) and a memory 1204 in communication with the processing circuitry 1202. The memory 1204 contains instructions executable by the processor 1202. In one embodiment, the memory 1204 contains instructions executable by the processor 1202 such that the apparatus is operable to send a request for the content to a first network node, receive a redirection instruction from the first network node, wherein the redirection instruction indicates a content delivery network and indicates a data transfer policy, send a request for the content to the content delivery network, wherein the request indicates the data transfer policy, and receiving data associated with the content from the content delivery network according to the data transfer policy.

Figure 13:
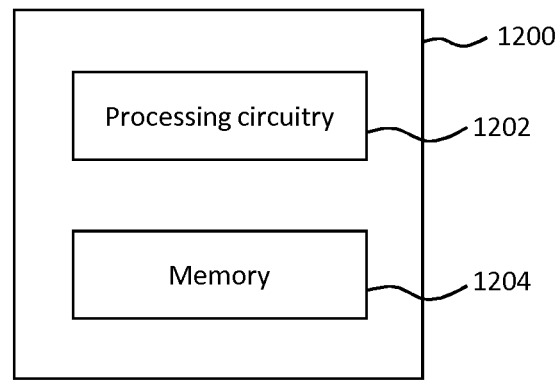
FIG. 13 a schematic illustration of an example of apparatus for redirecting a device to content.

FIG. 13 shows an example of apparatus 1300 according to embodiments of the disclosure. The apparatus 1300 may be for example an apparatus for redirecting a device to content. The apparatus 1300 may be configured to perform the method of FIG. 5 or any other example.

The apparatus 1300 comprises processing circuitry 1302 (e.g. a processor) and a memory 1304 in communication with the processing circuitry 1302. The memory 1304 contains instructions executable by the processor 1302. In one embodiment, the memory 1304 contains instructions executable by the processor 1302 such that the apparatus is operable to receive a request for the content from a device, and send a redirection instruction to the device, wherein the redirection instruction indicates a content delivery network and indicates a data transfer policy for transfer of data associated with the content between the device and a content delivery network.

Figure 14:
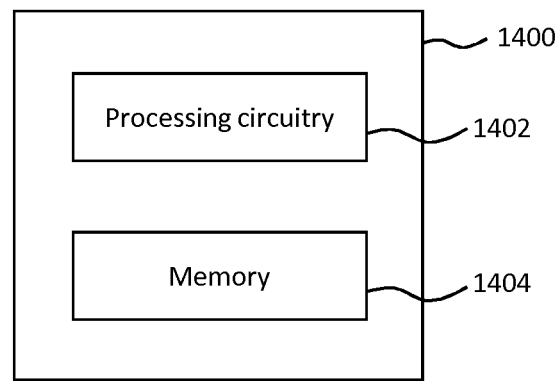
FIG. 14 is a schematic illustration of an example of apparatus for delivering content.

FIG. 14 shows an example of apparatus 1400 according to embodiments of the disclosure. The apparatus 1400 may be for example an apparatus for delivering content. The apparatus 1400 may be configured to perform the method of FIG. 6 or any other example.

The apparatus 1400 comprises processing circuitry 1402 (e.g. a processor) and a memory 1404 in communication with the processing circuitry 1402. The memory 1404 contains instructions executable by the processor 1402. In one embodiment, the memory 1404 contains instructions executable by the processor 1402 such that the apparatus is operable to receive a request for content from a device, the request indicating a data transfer policy, and send data associated with the content to the device according to the data transfer policy.

Figure 15:
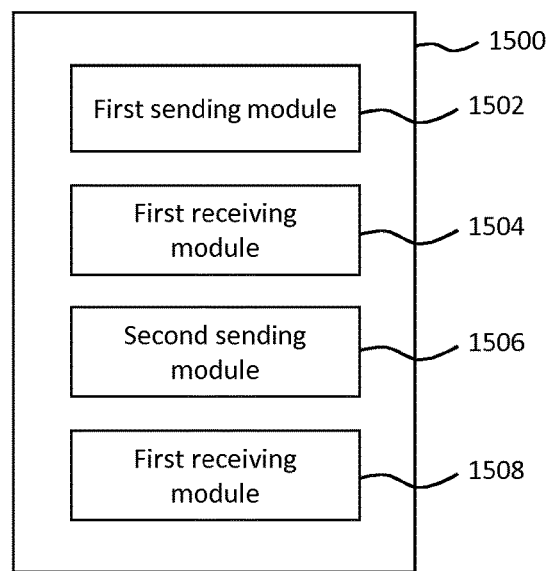
FIG. 15 is a schematic illustration of an example of apparatus for receiving content.

FIG. 15 shows an example of an apparatus 1500, for example for receiving content. The apparatus 1500 comprises a first sending module configured to send a request for the content to a first network node, and a first receiving module 1504 configured to receive a redirection instruction from the first network node, wherein the redirection instruction indicates a content delivery network and indicates a data transfer policy. The apparatus 1500 also comprises a second sending module 1506 configured to send a request for the content to the content delivery network, wherein the request indicates the data transfer policy, and a second receiving module 1508 configured to receive data associated with the content from the content delivery network according to the data transfer policy.

Figure 16:
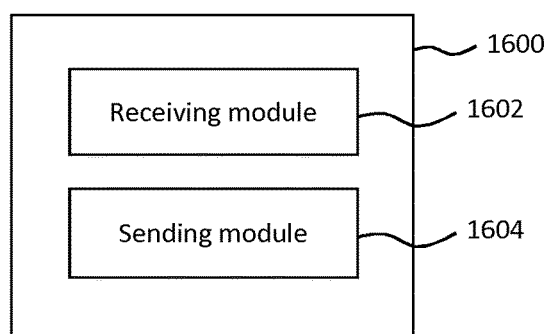
FIG. 16 a schematic illustration of an example of apparatus for redirecting a device to content.

FIG. 16 shows an example of an apparatus 1600, for example for redirecting a device to content. The apparatus 1600 comprises a receiving module 1602 configured to receive a request for the content from a device, and a sending module 1604 configured to send a redirection instruction to the device, wherein the redirection instruction indicates a content delivery network and indicates a data transfer policy for transfer of data associated with the content between the device and a content delivery network.

Figure 17:
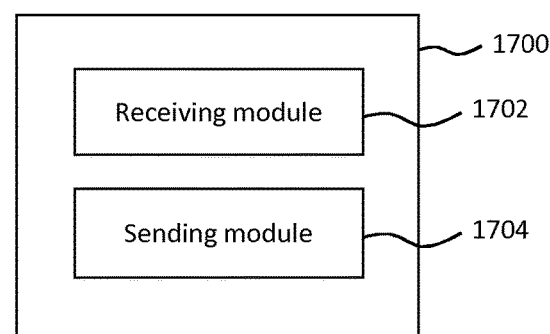
FIG. 17 is a schematic illustration of an example of apparatus for delivering content.

FIG. 17 shows an example of an apparatus 1700, for example for delivering content. The apparatus 1700 comprises a receiving module 1702 configured to receive a request for the content from a device, a sending module 1704 configured to send a redirection instruction to the device, wherein the redirection instruction indicates a content delivery network and indicates a data transfer policy for transfer of data associated with the content between the device and a content delivery network.

Figure 18:
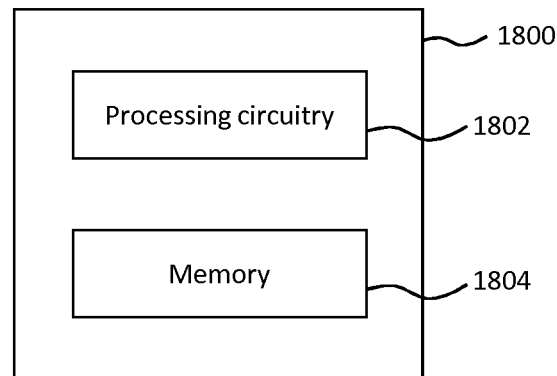
FIG. 18 is a schematic illustration of an example of apparatus for monitoring content delivery.

FIG. 18 shows an example of apparatus 1800 according to embodiments of the disclosure. The apparatus 1800 may be for example an apparatus for monitoring content delivery. The apparatus 1800 may be configured to perform the method of FIG. 8 or any other example.

The apparatus 1800 comprises processing circuitry 1802 (e.g. a processor) and a memory 1804 in communication with the processing circuitry 1802. The memory 1804 contains instructions executable by the processor 1802. In one embodiment, the memory 1804 contains instructions executable by the processor 1802 such that the apparatus is operable to, responsive to a notification that content is being delivered to a device from a content delivery network according to a data transfer policy, the notification including an indication of the data transfer policy, monitor delivery of the content from the content delivery network to the device, and, responsive to a detection that the delivery of the content violates the data transfer policy, perform a notification action.

Figure 19:
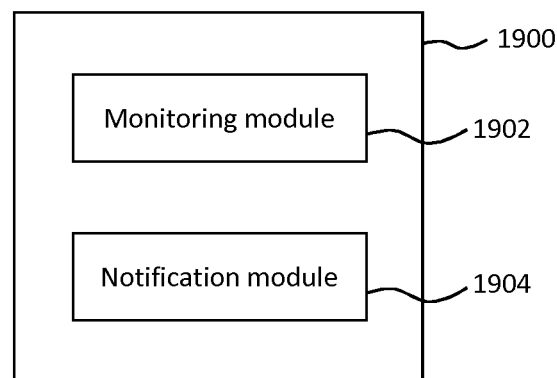
FIG. 19 is a schematic illustration of an example of apparatus for monitoring content delivery.
Figure 20:
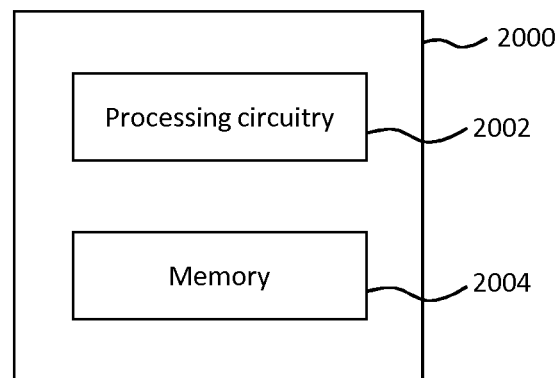
FIG. 20 is a schematic illustration of an example of apparatus for receiving ABR content.

FIG. 19 shows an example of an apparatus 1900, for example for monitoring content delivery. The apparatus 1900 comprises a monitoring module 1902 configured to monitor delivery of the content from the content delivery network to the device in response to a notification that content is being delivered to a device from a content delivery network according to a data transfer policy, the notification including an indication of the data transfer policy, and a notification module 1904 configured to performing a notification action responsive to a detection that the delivery of the content violates the data transfer policy FIG. 20 shows an example of apparatus 2000 according to embodiments of the disclosure. The apparatus 2000 may be for example an apparatus for receiving ABR content. The apparatus 2000 may be configured to perform the method of FIG. 11 or any other example.

The apparatus 2000 comprises processing circuitry 2002 (e.g. a processor) and a memory 2004 in communication with the processing circuitry 2002. The memory 2004 contains instructions executable by the processor 2002. In one embodiment, the memory 2004 contains instructions executable by the processor 2002 such that the apparatus is operable to receive an ABR manifest associated with the content, the ABR manifest describing a plurality of segments of content and specifying a plurality of policies and respective associated data transfer rules, receive an indication identifying one of the policies, and request segments of the content from a content delivery network in accordance with the data transfer rules associated with the policy identified by the indication.

Figure 21:
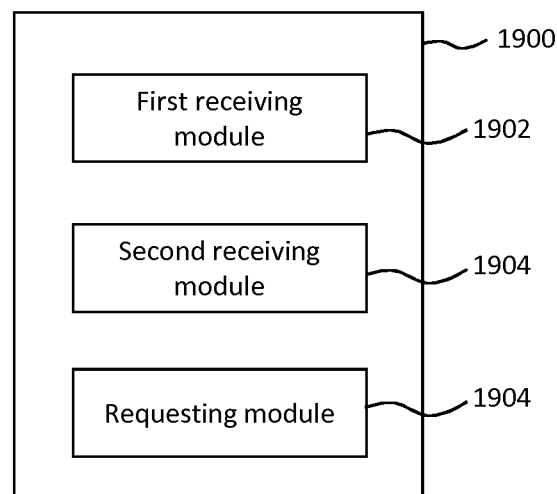
FIG. 21 is a schematic illustration of an example of apparatus for receiving ABR content.

FIG. 21 shows an example of an apparatus 2100, for example for receiving ABR content. The apparatus 2100 comprises a first receiving module 2102 v to receive an ABR manifest associated with the content, the ABR manifest describing segments of content and specifying a plurality of policies and respective associated data transfer rules, a second receiving module 2104 configured to receive an indication identifying one of the policies, and a requesting module 2106 configured to request segments of the content from a content delivery network in accordance with the data transfer rules associated with the policy identified by the indication.

FIG. 22 shows an example of portions of a manifest file, for example portions of an implementation of manifest file 1000.

In any of the embodiments described herein, an indication of the data transfer or content delivery policy to be implemented for content delivery from a CDN to a device may be received by the entity responsible for implementing the policy from any suitable node, for example from a RR, device or CDN node, and in any suitable form, such as a HTTP header or URL. The policy to be implemented can be determined by any suitable node, for example a Request Router in a network.

In any of the embodiments described herein, a URL used to request a manifest or content portion such as a segment, and/or an indication of a content delivery policy or data transfer policy, may be encoded, encrypted or scrambled in such a manner so that it may hinder or prevent a network (e.g. mobile network), a device or a third party from interpreting the URL or the indication.

Embodiments disclosed herein may use HTTP to send requests or redirections, or to retrieve data structures, manifests, content, segments or other data. In any embodiments, HTTP Secure (HTTPS) or any other suitable protocol may be used for any of the communications.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method, in a device, of receiving Adaptive Bit Rate (ABR) content, the method comprising:
   receiving an ABR manifest associated with the content, the ABR manifest describing segments of content and specifying a plurality of policies and respective associated data transfer rules;
   receiving an indication identifying one of the policies, wherein receiving the indication comprises receiving a redirect instruction identifying a Uniform Resource Locator (URL) that includes the indication as a parameter in the URL, and wherein the indication is encrypted;
   decrypting the indication; and
   requesting segments of the content from a content delivery network in accordance with the data transfer rules associated with the policy identified by the decrypted indication.

2. The method of claim 1, wherein the ABR manifest is received from the content delivery network, and the indication is received from the content delivery network.

3. The method of claim 2, wherein the indication is received in a communication containing the ABR manifest.

4. The method of claim 1, wherein the indication is received from a communications network.

5. The method of claim 4, further comprising requesting the ABR manifest from the communications network.

6. The method of claim 1, wherein the data transfer rules comprise a data rate, a content quality, a maximum data rate, or a maximum content quality for transfer of the requested segments from the content delivery network to the device.

7. The method of claim 1:
   wherein the ABR manifest specifies a plurality of representations of the content with respective data rates; and
   wherein the data transfer rules for each policy identify one or more of the representations that are permitted in accordance with that policy.

8. A non-transitory computer readable recording medium storing a computer program product for controlling a device for receiving Adaptive Bit Rate (ABR) content, the computer program product comprising program instructions which, when run on processing circuitry of the device, causes the device to:
   receive an ABR manifest associated with the content, the ABR manifest describing segments of content and specifying a plurality of policies and respective associated data transfer rules;

receive an indication identifying one of the policies, wherein the indication is a parameter in a Uniform Resource Locator (URL) identified in a redirect instruction, and wherein the indication is encrypted;

decrypting the indication; and request segments of the content from a content delivery network in accordance with the data transfer rules associated with the policy identified by the decrypted indication.

9. An apparatus for receiving Adaptive Bit Rate (ABR) content, the apparatus comprising:

processing circuitry;

memory containing instructions executable by the processing circuitry whereby the apparatus is operative to:

receive an ABR manifest associated with the content, the ABR manifest describing a plurality of segments of content and specifying a plurality of policies and respective associated data transfer rules;

receive an indication identifying one of the policies, wherein the indication is a parameter in a Uniform Resource Locator (URL) identified in a redirect instruction, and wherein the indication is encrypted;

decrypt the indication; and request segments of the content from a content delivery network in accordance with the data transfer rules associated with the policy identified by the decrypted indication.

10. The apparatus of claim 9, wherein the instructions are such that the apparatus is operative to:

receive the ABR manifest from the content delivery network; and receive the indication from the content delivery network.

11. The apparatus of claim 10, wherein the instructions are such that the apparatus is operative to receive the indication in a communication containing the ABR manifest.

12. The apparatus of claim 9, wherein the instructions are such that the apparatus is operative to receive the indication from a communications network.

13. The apparatus of claim 12, wherein the instructions are such that the apparatus is operative to request the ABR manifest from the communications network.

14. The apparatus of claim 9, wherein the data transfer rules comprise a data rate, a content quality, a maximum data rate, or a maximum content quality for transfer of the requested segments from the content delivery network to the device.

15. The method of claim 9:

wherein the ABR manifest specifies a plurality of representations of the content with respective data rates; and wherein the data transfer rules for each policy identify one or more of the representations that are permitted in accordance with that policy.

* * * * *